United States Patent
Eunkyoung et al.

[11] Patent Number: 5,958,997
[45] Date of Patent: Sep. 28, 1999

[54] COMPOSITION FOR AND A METHOD FOR PRODUCING A POLYMERIC ION CONDUCTIVE MEMBRANE

[75] Inventors: Kim Eunkyoung; Lee Seobong, both of Taejeon; Kim Heejung, North Kyoungsang, all of Rep. of Korea

[73] Assignee: Korea Research Institute of Chemical Technology, Taejon, Rep. of Korea

[21] Appl. No.: 08/912,416

[22] Filed: Aug. 18, 1997

[30] Foreign Application Priority Data

Aug. 19, 1996 [KR] Rep. of Korea ................ 8-34269

[51] Int. Cl.$^6$ ........................................ C08F 2/46
[52] U.S. Cl. ..................... 522/182; 522/181; 522/79; 522/78; 429/33; 427/518
[58] Field of Search ...................... 522/182, 178, 522/181, 79; 427/518; 429/33

[56] References Cited

U.S. PATENT DOCUMENTS 4,830,939  5/1989  Lee et al. ................. 429/192
4,908,283  3/1990  Takahashi et al. ........ 429/217
5,238,758  8/1993  Lee et al. .................. 429/191

*Primary Examiner*—James J. Seidleck
*Assistant Examiner*—Sanza McClendon
*Attorney, Agent, or Firm*—Renner, Otto, Boisselle & Sklar

[57] ABSTRACT

The present invention provides a composition for a polymeric ion conductive membrane. Said composition comprises an alkaline salt, an acrylate and/or methacrylate of poly(ethylene glycol) alkyl ether with an unsaturated reactive radical, a poly(alkylene glycol) dimethacrylate or a poly(alkylene glycol) trimethacrylate, a vinylic monomer and an UV radiation curing initiator.

The present invention further provides a method for producing said polymeric ion conductive membrane with the composition.

The polymeric ion conductive membrane so produced according to the present invention has an excellent mechanical feature, strong adhesive strength and high ionic conductivity at room temperature.

6 Claims, 2 Drawing Sheets

COMPOSITION FOR AND A METHOD FOR PRODUCING A POLYMERIC ION CONDUCTIVE MEMBRANE

TECHNICAL FIELD OF THE INVENTION

The present invention relates to a composition for a polymeric ion conductive membrane that retains an excellent mechanical feature, strong adhesive strength and high ionic conductivity, and a method for producing the membrane.

BACKGROUND OF THE INVENTION

Since electrochemical parts utilizing solid electrolyte have no problem of solution leakage, can be formed into films or thin membranes and can also be miniaturized, they can be easily applied to portable electronic goods or motorcars in comparison with usual electrochemical parts using liquid electrolyte.

Particularly, a electrochemical cell using a solid polymeric ionic conductive membrane is light performs charging and discharging in high efficiency and can be adapted to various shapes. Accordingly, such polymeric ion conductive membrane has been the focus of researches and developments.

Recently, a process for preparing a electrochemical cell wherein a polymeric compound is used as electrolyte has been developed. Since the polymeric compound can be formed into a thin membrane, and has the ability to dissolve salt and transport ions it can be used as an electrolyte. The resulted solid electrolyte has small electric resistance and large electric current.

As set forth hereinabove, the electrochemical cell of said polymeric electrolyte should preserve both high ionic conductivity and good mechanical feature. However, it is difficult to improve both properties by merely changing mean molecular weight or the glass transition temperature of its polymer matrix.

Consequently, there is a long-felt need to develop a novel polymeric electrolyte which has both improved ionic conductivity and mechanical feature.

U.S. Pat. No. 4,654,279 to Bauer et al. disclosed a solid polymeric electrolyte which is two phase interpenetrating network consisting of a mechanically supporting phase of a continuous network of a cross linked polymer to improve the mechanical feature of the solid electrolyte and an ionic conducting phase which provides an ionic transmission path through a matrix.

U.S. Pat. No. 4,556,614 to Le Mehaute et al. disclosed a method of producing a solid electrolyte for an electrochemical cell, the electrolyte comprising at least one complexing polymer and at least on ionizable alkaline salt complexed in the polymer, wherein said complexing polymer is mixed with at least one second polymer miscible with the complexing polymer and having cross-linkable functions; said cross-linkable functions then being physically cross-linked, with the complexing polymer being brought to an essentially amorphous state during said cross-linking operation.

Xia et al. studied on the heat and ionic conductivity of a polymeric ion electrolyte prepared by polymerization of oligo-oxymethyl methacrylate. (Solid State Ionics. 1984, 14, p.221–224).

Also Korean Laid Open Patent Application No. 95-8604 to Kwang-Kyong Rhew disclosed a composition for an UV rays curing type-lithium ionic electrolyte of polymeric solid which comprises an UV rays curing type lithium salt, an acrylate and/or methacrylate of polyalkylene glycol having at least one unsaturated reactive radicals, an UV rays curing initiator and a curing promotor, and a method for the preparation thereof. However the composition can hardly be formed into an exact amorphous film (thin membrane) in practice. Thus the ionic conductivity of the resulted film changes remarkably as the temperature becomes different. Further the ionic conductivity at room temperature decreases significantly as time goes by.

In addition, since the back bone of the polymer comprises merely oxymethyl methacrylate unit, the resulted polymeric membrane is too hard, the ionic conductivity is not so high and the electrolyte membrane is fragile. Accordingly, it was difficult to apply the polymeric membrane to electrochemical solid parts.

The polymeric electrolyte prepared by the above process has a low ionic conductivity at room temperature (below $1\times10^{-5}$ S/cm), and a weak adhesiveness to the substrate.

When applied as a solid electrochemical parts, the polymeric electrolyte is cracked and its durability is reduced. Electrochemical parts or apparatus utilizing the polymeric electrolyte thus have reduced durability.

In order to solve the above problems, the inventors of the present invention started a research on polymeric ion electrolyte which can be prepared by polymerization of an oxyethyl methacrylate, a cross linking agent and a plasticizer.

The inventors have found, as a result of the research, when units derived from adequate cross linking agent and plasticizer are introduced into the chain of the polymer; the electric conductivity of the resulted polymeric ion electrolyte at room temperature increases to more than $10^{-4}$ S/cm and the mechanical feature improves. Further, the said polymeric ion electrolyte can be formed in thin films and still has an excellent adhesiveness.

In addition, the solid polymeric ion electrolyte membrane so produced can be in the form of a free standing film, which has an excellent adhesiveness when adhered to the substrate again.

The inventors have recognized that the said polymeric ion electrolyte membrane according to the present invention is neither cracked nor does it form pores even after more than three thousand cycles of charging and discharging which were carried out under a voltages from −3V to +3V, and that the membrane maintained excellent adhesiveness and can be applied to solid electrochemical parts.

SUMMARY OF THE INVENTION

The present invention, based on the afore-mentioned research, provides a polymeric ion conductive membrane with high ionic conductivity and a process for producing the same.

An object of the invention is to provide a composition for a polymeric ion conductive membrane that retains an excellent mechanical feature, strong adhesive strength and high ionic conductivity at room temperature.

Another object of the invention is to provide a method for producing said polymeric ion conductive membrane by photocuring the composition, subjecting the composition under heat treatment or coating the composition on a metal foil.

Accordingly to the present invention, the polymeric ion conductive membrane can be produced without any solvent which is usually used in prior art methods and which causes environment pollution.

3

These and other objects, advantages, features, and applications will become more apparent by the description below.

DETAILED DESCRIPTION OF THE INVENTION

Figure 1:
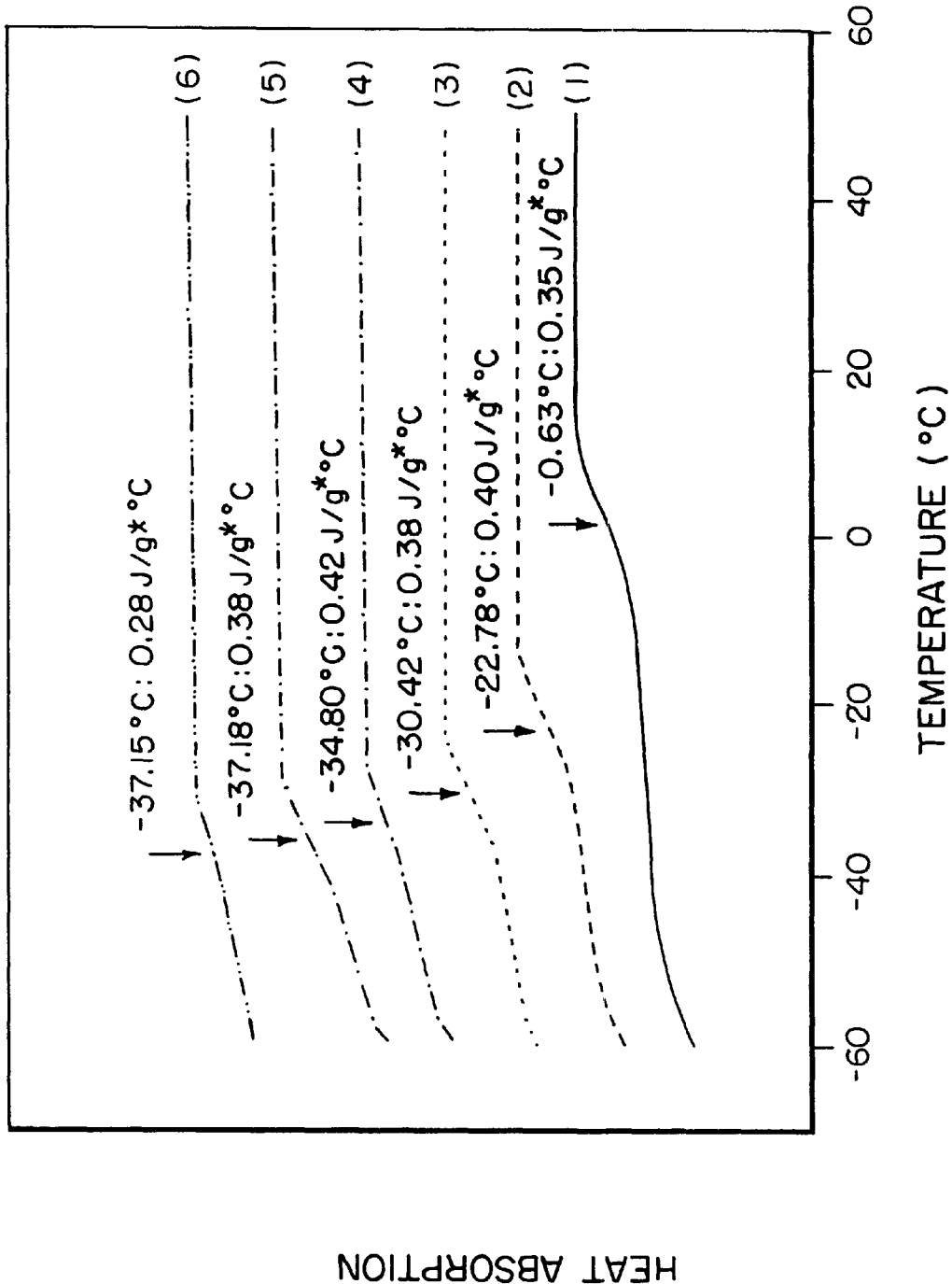
FIG. 1 shows a thermal analysis diagram of the ion conductive membrane of alkyleneoxy-acrylic series polymer produced by photocuring according to Examples 4, 5, 10 to 13.

The present invention provides a method for producing polymeric ion conductive membrane and a composition for the polymeric ion conductive membrane which retains an excellent mechanical feature, strong adhesive strength and high ionic conductivity.

The composition according to the present invention comprises 1 to 50 weight % of an alkaline salt by the total weight of the composition (hereinafter, referred to as "wt %") having general formula (I)

$$A^+B^- \quad (I)$$

wherein $A^+$ represents an alkali cation of lithium, sodium and the like, $B^-$ represents an anion of $Br^-$, $I^-$, $SCN^-$, $ClO_4^-$, $CF_3SO_3^-$, $N(CF_3SO_3)_2^-$, $BF_4^-$, $PF_6^-$, $AsF_6^-$ and the like, 0.1 to 20 wt % of a photocuring initiator; and 1 to 60 wt % of a compound of an acrylate and/or methacrylate of poly (ethylene glycol) alkyl ether having general formula (II)

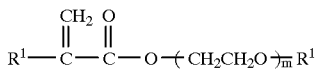

(II)

wherein $R^1$ denotes a hydrogen atom, or linear or branched lower alkyl group having 1 to 20 of carbon atom, m represents an integer ranging from 200 to 1000, desirably 300 to 500, n represents an integer ranging from 1 to 10 desirably 2 to 4; and 1 to 60 wt % of a cross linking agent by the total weight of the compound of the general formula II, having general formula III

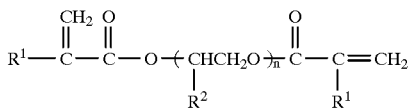

(III)

wherein $R^1$ is the same as defined above, $R^2$ represents $R^1$ or a radical of general formula (IV)

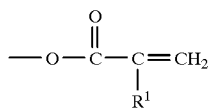

(IV)

wherein $R^1$ and n are the same as defined above; and 1 to 50 wt % of a vinylic monomer having general formula (V)

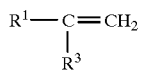

(V)

wherein $R^1$ is the same as defined above, $R^3$ denotes a phenyl group or a radical having general formula (VI)

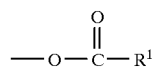

(VI)

wherein $R^1$ is the same as defined above.

The method for producing the polymeric solid ion conductive membrane according to the present invention comprises coating the composition onto an adequate substrate and curing the coating by irradiation of UV radiation to give a polymeric membrane, and optionally, subjecting the resulted membrane to heat treatment after the irradiation of the UV radiation.

The present invention will be illustrated in detail below.

The photocuring initiator, i.e. an UV radiation curing initiator added to the composition of the present invention can be selected from a group consisting of dimethoxypenylacetophenone (DMPA), 2-methyl-1-(4-methylthiophenyl)-morpholinopropanone-1 (MMMP), 2-benzyl-2-dimethylamino-1-(4-morpholinophenyl)-butanone-1 (BDMP), 1-hydroxycyclohexyl phenyl ketone (1-HCHPK), benezophenone, 2,4-dihydroxybenzophenone, 2-hydroxy-4-methoxybenzophenone, benzyl disulfide, acetophenone, butanedione, carbazole, fluorenon, benzoin, benzoin isobutyl ether (BIBE), 2-chlorothioxanthone, thioxanthone, BEZYL and so on.

In the polymeric ionic conductive membrane of the present invention, the cross linking agent of the general formula (III) and the vinylic monomer of the general formula (V) are both compounds with low molecular weight. They form a network of polymer which plays a role as to the mechanical feature and ionic conductivity of the novel membrane of the present invention.

Of these low molecular compounds, the cross linking agent of the general formula (III) is used in the amount of 1 to 60 wt %, desirably 10 to 30 wt % of the total weight of the compound of the acrylate and/or metacrylate of poly (ethylene glycol) alkyl ether of the general formula (II), and the vinylic monomer of the general formula (V) is used in the amount of 1 to 50 wt %, desirably 5 to 15 wt %.

If the amount of the cross linking agent of the general formula (III) should exceed said range, the polymeric ionic conductive membrane's elasticity would be deteriorated and the membrane would become fragile. Should the amount be below the range, the membrane would not be formed well. Further, with respect to the vinylic monomer of the general formula (V) should the amount exceed said range, the network of polymer would not form well and the ionic conductivity would be deteriorated, while if the amount should be below the range, the flexibility of the membrane would decrease to deteriorate the membrane's mechanical feature. The compound of the acrylate and/or methacrylate of poly(ethylene glycol) alkyl ether of the general formula (II) can be comprised in the amount of 10 to 30 wt %, while the alkaline salt can be comprised in the amount of 1 to 50 wt %, desirably 10 to 30 wt % of the total weight of the composition and the photocuring agent should be in the amount of 0.1 to 20 wt %, desirably 1 to 10 wt %.

When the amount of the alkaline salt exceeds the above range the salt would be crystallized to decrease the membrane's ionic conductivity. In the case where the amount of the alkaline salt is below the above range, the membrane's ionic conductivity will decrease.

Various additives and/or fillers such as common antioxidant, dyestuffs, pigments, lubricants and thickeners which have been publicly known to people having ordinary skill in the pertinent field may be added to the composition of the present invention to improve the membrane's mechanical characteristics and to increase the membrane's heat-resistance.

In addition, to increase the ion conductivity of the polymeric ion conductive membrane to over $1\times10^{-4}$ S/cm, 1 to 60wt % by the total weight of the compound of the general formula (II) of a high boiling point solvent such as propylene carbonate maybe added as a plasticizer together with the vinylic nomoner of the general formula (V)

The polymeric ion conductive membrane of the present invention can be produced by curing the composition with irradiation of UV radiations of 200 to 400 nm to form the polymer network.

Further, the polymeric ion conductive membrane of the present invention may be subjected to heat treatment after the irradiation of UV radiations.

The polymeric ion conductive membrane of the present invention can be produced by coating the composition of the invention onto a foil of lithium, aluminium or lithium-copper and curing the coating by UV radiation.

The composition of the present invention may be cured in the absence of solvent to provide a solid electrolytic membrane, which is transparent and completely amorphous at room temperature and has an excellent mechanical feature with an ionic conductivity of over $1\times10^{-4}$ S/cm at room temperature.

Meanwhile, when the polymeric ion conductive membrane is subjected to heat treatment at 100 to 150° C., the ionic conductivity of the membrane at room temperature increases to, for example, $5.0\times10^{-5}$ S/cm or high.

Thus, as understood, the composition of the present invention can provide a polymeric ion conductive membrane which has an excellent ion conductivity at room temperature even if the composition underwent photopolymerization and was subjected to repeated heat treatment.

The membrane of the present invention may have an adjusted thickness according to its various applications such as for the preparation of solid electrochemical parts and the like, and is not particularly limited.

Since the polymeric ion conductive membrane of the present invention may be produced by curing the composition with the irradiation of UV radiation in the absence of any solvent and all reactants take part to form the polymer network, drying or washing after producing the membrane becomes unnecessary and required reaction time is thereby extremely reduced to enable in-line process which simplifies the production of the membrane.

In addition the solid polymeric ion conductive membrane of the present invention having excellent mechanical feature and strong adhesive force together with high ionic conductivity at room temperature can be adapted to various shapes. Accordingly, it is possible to apply the polymeric ion conductive membrane of the present invention to solid electrochemical parts such as electric cells, sensors, electric apparatus for changing color and the like.

As set forth hereinabove, the present invention relates to the composition for the polymeric ion conductive membranae which has high ionic conductivity at room temperature.

The polymeric ion conductive membrane is formed by a polymer network complexed by an alkaline salt, an acrylate and/or methacrylate of poly(ethylene glycol) alkyl ether with an unsaturated reactive radical, a poly(alkylene glycol) dimethacrylate or a poly(alkylene glycol) trimethacrylate and a vinylic monomer even in the absence of any solvent. The polymeric ion conductive membrane is produced by heat curation under the heat treatment after photo-curation. Thus, the present invention provides a polymeric ion conductive membrane retaining strong adhesiveness with the surface of a substrate.

The present invention will be understood more readily with reference to the following examples; however these examples are intended to illustrate the present invention in detail and are not to be construed to limit the scope of the invention.

EXAMPLE 1

1 g of tripropylene glycol dimethacrylate (a product of polyscience company), 1 g of butyl methacrylate and 0.5 g of dimetoxyphenyl acetophenone (DMPA) were mixed with 5 g of poly(ethylene glycol) monomethacrylate monomethyl ether (Molecular weight: 400, a product of Polyscience company). To the mixture was added 1.48 g of lithium trifluoromethanesulfonate and the resulted mixture was coated onto a copper foil. The coating was radiated with UV radiation of 200 to 400 nm under the nitrogen stream for 2 minutes. By such irradiation, a transparent polymeric membrane having excellent adhesive strength was obtained.

Figure 2:
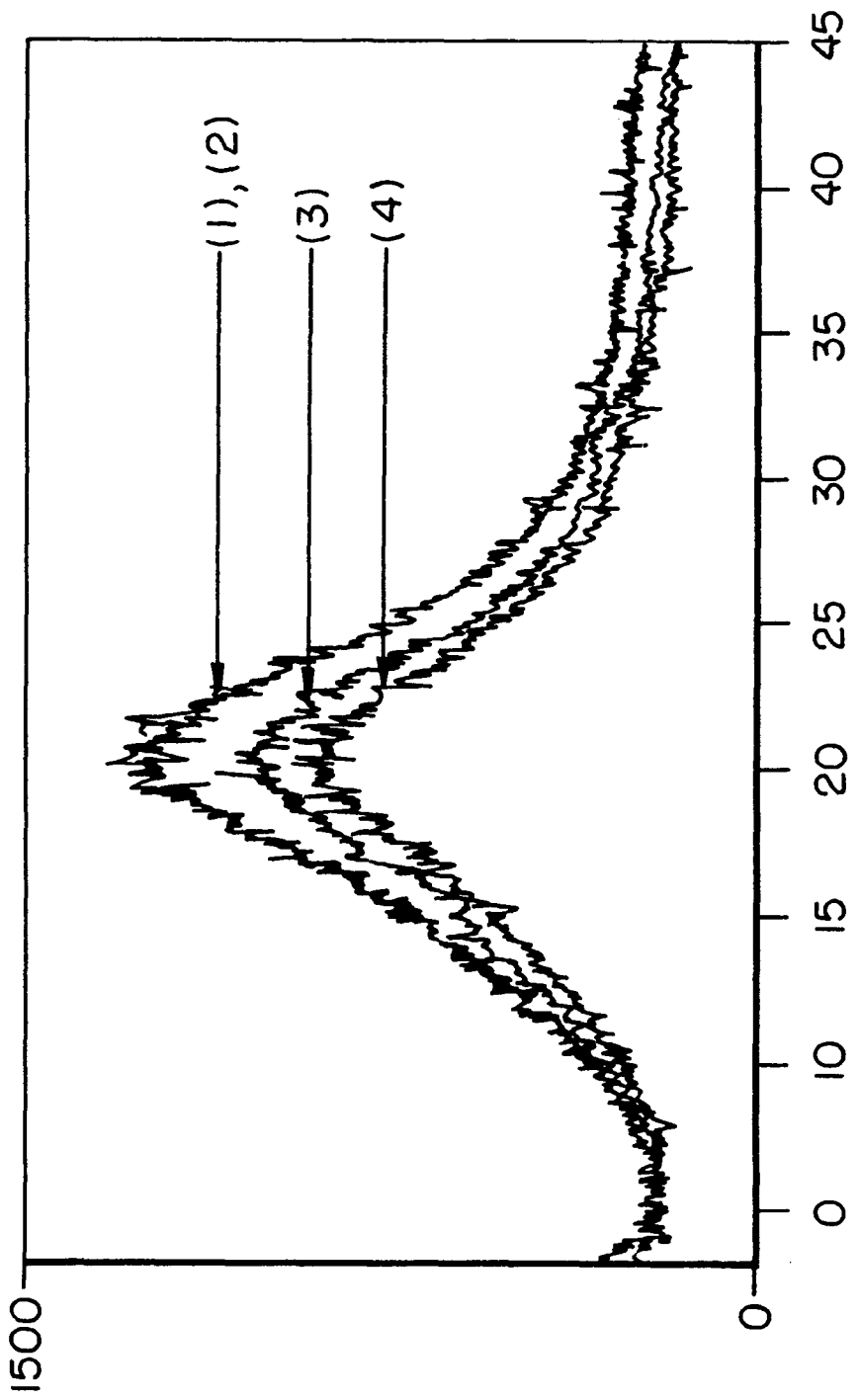
FIG. 2 shows a x-ray diffraction microscopy of the polymeric membrane produced in Examples 1, 3, 4 and 5.

X-ray diffraction analysis:

The result of X-ray diffraction analysis of the produced polymeric membrane is reported in FIG. 2. As shown, which indicated that the polymeric membrane of the present invention is exactly amorphous at room temperature.

Ionic Conductivity

The ionic conductivity of the polymeric membrane is tested by the impedance method. The composition for the polymeric ion conductive membrane was coated onto a conductive glass substrate of the band type and was cured to polymerize and dried thoroughly. Thereafter, the AC impedance between electrodes was measured and the value was determined by the frequency response analyzer to interpret the complex impedance.

The ionic conductivity of the solid polymeric membrane obtained in Example 1 was $1\times10^{-4}$ S/cm at room temperature.

EXAMPLE 2 (comparative)

1 g of tri(propylene glycol) dimethacrylate and 0.5 g of lithium perchlorate were added to 5 g of poly(ethylene glycol) monomethacrylate monomethyl ether as in Example 1. To this mixture, 0.5 a of DMPA was added and the resulted mixture was coated onto an aluminum foil (the degree of strength is of the level for industrial use.)

The coating was radiated with UV radiation of 200 to 400 nm under nitrogen stream for 5 minutes. The polymeric membrane obtained by the above irradiation was transparent but the adhesive strength and the mechanical feature of the membrane were deteriorated. The ionic conductivity of the membrane was $1\times10^{-8}$ s/cm at room temperature.

EXAMPLE 3

1 g of tri(propylene glycol) dimethacrylate, 1 g of styrene and 0.5 g of lithium perchlorate were mixed with 5 g of poly(ethylene glycol) monomethacrylate momethyl ether as in Example 1. To the mixture is added 0.5 g of DMPA and the resulted mixture was coated onto an aluminum foil. The coating was radiated with UV radiation of 200 to 400 nm under nitrogen stream for several minutes.

By such irradiation a polymeric membrane was obtained, which was transparent and had excellent adhesive force. The ionic conductivity was $1 \times 10^{-6}$ s/cm at room temperature.

EXAMPLE 4

A polymeric membrane was obtained by the same process as in Example 3 except for that the styrene was replaced with butyl methacrylate. The resulted polymeric membrane was transparent and had excellent adhesive strength. The ionic conductivity was $5 \times 10^{-6}$ s/cm at room temperature.

EXAMPLES 5 TO 13

Polymeric membranes were obtained by the same process as in Example 1 except for that the mixtures were prepared as shown in Table 1 and coated on the copper foil.

TABLE 1

| Examples | MPEGM (g) | TPGDA (g) | BMA (g) | LiCF$_3$SO$_3$ (g) | DMPA (g) | Ionic Conductivity (S/cm) |
|---|---|---|---|---|---|---|
| Ex. 5  | 5 | 1 | 1 | 2.96 | 0.5 | $2 \times 10^{-6}$ |
| Ex. 6  | 5 | 1 | 1 | 1.85 | 0.5 | $6 \times 10^{-5}$ |
| Ex. 7  | 5 | 1 | 1 | 1.65 | 0.5 | $2 \times 10^{-4}$ |
| Ex. 8  | 5 | 1 | 1 | 1.35 | 0.5 | $6 \times 10^{-5}$ |
| Ex. 9  | 5 | 1 | 1 | 1.24 | 0.5 | $7 \times 10^{-5}$ |
| Ex. 10 | 5 | 1 | 1 | 0.98 | 0.5 | $8 \times 10^{-6}$ |
| Ex. 11 | 5 | 1 | 1 | 0.74 | 0.5 | $7 \times 10^{-6}$ |
| Ex. 12 | 5 | 1 | 1 | 0.59 | 0.5 | $2 \times 10^{-6}$ |
| Ex. 13 | 5 | 1 | 1 | 0.49 | 0.5 | $2 \times 10^{-6}$ |

MPEGM: Poly(ethylene glycol) monomethacrylate monomethyl ether
TPGDA: Tri(propylene glycol) dimethacrylate
BMA: Butyl methacrylate
DMPA: Dimethoxyphenyl acetophenone

EXAMPLE 14

1 g of tri(propylene glycol) dimethacrylate, 1 g butyl methacrylate, 1.48 g of lithium trifluoromethanesulfonate and 0.5 g of DMPA were added to 5 g of poly(ethylene glycol) monomethacrylate monomethyl ether as in Example 1 and were mixed well. To the mixture was added 40 wt % of propylene carbonate.

The resulted mixture was coated onto an aluminum foil. The coating was radiated with UV radiation of 200 to 400 nm under nitrogen stream for 5 minutes. By such irradiation a polymeric membrane was obtained which was transparent and had excellent adhesive strength. The ionic conductivity was $3 \times 10^{-4}$ s/cm at room temperature.

EXAMPLES 15 TO 18

Polymeric membrane were obtained by the same process as in Example 14 except for that the mixture was prepared as shown in Table 2 below and was coated on the aluminum foil.

TABLE 2

| Examples | MPEGM (g) | TPGDA (g) | BMA (g) | LiCF$_3$SO$_3$ (g) | DMPA (g) | PC (wt %) | Ionic Conductivity (S/cm) |
|---|---|---|---|---|---|---|---|
| Ex. 15 | 5 | 1 | 1 | 1.48 | 0.5 | 10 | $3 \times 10^{-5}$ |
| Ex. 16 | 5 | 1 | 1 | 1.48 | 0.5 | 20 | $3 \times 10^{-5}$ |
| Ex. 17 | 5 | 1 | 1 | 1.48 | 0.5 | 30 | $2 \times 10^{-4}$ |
| Ex. 18 | 5 | 1 | 1 | 1.48 | 0.5 | 50 | $2 \times 10^{-4}$ |

MPEGM, TPGDA, BMA and DMPA are the same as defined in Table 1 and PC denotes propylene carbonate.

EXAMPLE 19

1 g of Tri(propylene glycol) dimethacrylate and 1 g of styrene and 0.5 g of lithium perchlorate were mixed with 5 g of poly(ethylene glycol) monomethacrylate monomethyl ether as in Example 1. To the mixture was added 0.5 g of DMPA. The resulted mixture was coated onto a lithium foil. The coating was radiated with UV radiation of 200 to 400 nm under nitrogen stream for several minutes. By such irradiation, a polymeric membrane was obtained, which was transparent and had excellent adhesive strength.

The resulted membrane was then subjected to a secondary heat curation at 110 to 150° C., desirably 130° C. for 1 minute. The ionic conductivity after the secondary heat curation was $5 \times 10^{-5}$ s/cm.

EXAMPLE 20

A polymeric membrane was obtained by the same process as in Example 19 except for that the styrene was replaced with butyl methacrylate. The resulted membrane was transparent and had excellent adhesive strength.

EXAMPLE 21

1 g of tri(propylene glycol) dimethacrylate, 1 g of butyl methacrylate and 0.5 g of DMPA were mixed with 5 g of poly(ethylene glycol) methacrylate monomethyl ether as in Example 1.

To the mixture was added 1.48 g of lithium trifluoromethanesulfonate. The resulted mixture was coated onto a conductive glass electrode. The coating was then radiated with UV radiation of 254 nm under nitrogen stream for several minutes.

By such irradiation a polymeric membrane was obtained, which was transparent and had excellent adhesive strength.

The resulted polymeric membrane was subjected to heat treatment at 100° C. to 150° C., desirably 130° C. for 1 minute to be cured secondarily.

The ionic conductivity of the polymeric membrane obtained by the secondary heat curation was $2 \times 10^{-5}$ S/cm

EXAMPLES 22 TO 30

Polymeric membranes were obtained by the same process as in Example 21 except for that the mixtures were prepared as shown in Table 3 and coated onto conductive glass electrodes.

The ionic conductivities of the obtained polymeric membrane were measured and the results are shown in Table 3 below.

TABLE 3

| Examples | MPEGM (g) | TPGDA (g) | BMA (g) | LiN(CF$_3$SO$_3$)$_2$ (g) | 1-HCKPK (g) | Ionic Conductivity (S/cm) |
|---|---|---|---|---|---|---|
| Ex. 22 | 5 | 1 | 1 | 2.96 | 0.5 | $5 \times 10^{-5}$ |
| Ex. 23 | 5 | 1 | 1 | 1.85 | 0.5 | $8 \times 10^{-4}$ |
| Ex. 24 | 5 | 1 | 1 | 1.65 | 0.5 | $9 \times 10^{-5}$ |
| Ex. 25 | 5 | 1 | 1 | 1.35 | 0.5 | $6 \times 10^{-5}$ |
| Ex. 26 | 5 | 1 | 1 | 1.24 | 0.5 | $3 \times 10^{-5}$ |
| Ex. 27 | 5 | 1 | 1 | 0.98 | 0.5 | $2 \times 10^{-5}$ |
| Ex. 28 | 5 | 1 | 1 | 0.74 | 0.5 | $9 \times 10^{-6}$ |
| Ex. 29 | 5 | 1 | 1 | 0.59 | 0.5 | $2 \times 10^{-6}$ |
| Ex. 30 | 5 | 1 | 1 | 0.49 | 0.5 | $9 \times 10^{-6}$ |

MPEGM, TPGDA and BMA are the same as defined in Table 1 and 1-HCHPK denotes 1-hyroxycyclohexyl phenyl ketone.

EXAMPLE 31

1g of tri(propylene glycol) dimethacrylate, 1.48 g of lithium trifluoromethane sulfonate and 0.5 g of DMPA were add to 5 g of poly(ethylene glycol) monomethacrylate monomethyl ether as in Example 1 and mixed well. The mixture is coated onto an ionic conductive glass electrode. The coating was radiated with UV radiations of 200 to 400 nm under nitrogen stream for several minutes. By such irradiation, a polymeric membrane was obtained, which was transparent and had excellent adhesive strength.

The resulted polymeric membrane was subjected to heat treatment at 100 to 150° C., desirably 130° C. for 1 minute to be cured. A heat-treated polymeric membrane was obtained.

EXAMPLES 32 TO 35

(A process for producing a polymeric membrane by heat treatment after photo cross linking)

Polymeric membranes were obtained by the same process as in Example 31 except for the mixtures were prepared as shown in Table 4 and coated onto ionic conductive glass electrodes. The ionic conductivities of the resulted polymeric membranes are shown in Table 4 below.

TABLE 4

| Examples | MPEGM (g) | TPGDA (g) | BMA (g) | LiCF$_3$SO$_3$ (g) | DMPA (g) | PC (wt %) | Ionic Conductivity (S/cm) |
|---|---|---|---|---|---|---|---|
| Ex. 32 | 5 | 1 | 1 | 1.48 | 0.5 | 10 | $5 \times 10^{-5}$ |
| Ex. 33 | 5 | 1 | 1 | 1.48 | 0.5 | 20 | $4 \times 10^{-4}$ |
| Ex. 34 | 5 | 1 | 1 | 1.48 | 0.5 | 40 | $2 \times 10^{-4}$ |
| Ex. 35 | 5 | 1 | 1 | 1.48 | 0.5 | 50 | $7 \times 10^{-5}$ |

MPEGM, TPGDA, BMA and DMPA are the same as defined in Table 1 and PC denotes propylene carbonate.

EXAMPLE 36

1 g of tri(propylene glycol) dimethacrylate, 1 g of butyl methacrylate, 0.5 g of EMPA and 1.5 g of lithium trifluoromethanesulfonate were mixed with 5 g of poly(ethylene glycol) monomethacrylate monomethyl ether as in Example 1.

The mixture is coated onto a copper foil (the degree of strength is of the level for industrial use.) with wire bars. The coating was radiated with UV radiation under argon atmosphere for 5 minutes. An ionic conductive membrane was obtained, which is transparent.

EXAMPLE 37

Preparation of a Positive Pole

By the same process as in Example 36 except for that an aluminium foil coated with lithium cobalt oxide was used instead of the copper foil a transparent ionic conductive film was obtained.

Various modification are contemplated which will be apparent to those skilled in the art and can be applied to the preferred embodiment described above without departing from the spirit and scope of the invention as defined by the following claims.

What is claimed is:

1. A composition for polymeric ionic conductive membrane, said composition comprising: 1 to 50 wt % of an alkaline salt of general formula (I)

$$A^+B^- \quad (I)$$

wherein A$^+$ represented as an alkali cation, B$^-$ represented an anion of Br$^-$, I$^-$, SCN$^-$, ClO$_4^-$, CF$_3$SO$_3^-$, N(CF$_3$SO$_3$)$_2^-$, BF$_4^-$, PF$_6^-$, and AsF$_6^-$; 0.1 to 20 wt % of a photo curing initiator; 1 to 60 wt % of a compound of an acrylate and/or methacrylate of poly(ethylene glycol)ether having general formula (II)

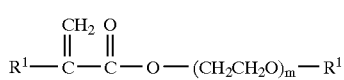
(II)

wherein $R^1$ denote a hydrogen atom, or linear or branched lower alkyl group having 1 to 20 of carbon atom, m represents an integer ranging from 200 to 1,000, n represents an integer ranging from 1 to 10, desirably 2 to 4; and 1 to 60 wt % of a cross linking agent by total weight of the compound of the general formula (II), having general formula (III)

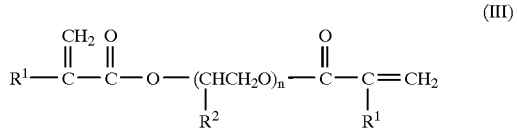
(III)

wherein $R^1$ is the same as defined above $R^2$ represents $R^1$ or a radical of formula (IV)

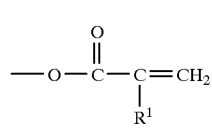
(IV)

wherein $R^1$ and n are the same as defined above; and 1 to 50 wt % of a vinylic monomer having general formula (V)

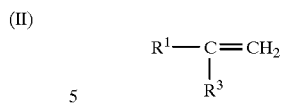
(V)

wherein $R^1$ is the same as defined above, $R^3$ denotes a phenyl group or a radical of general formula (VI)

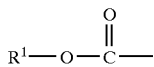
(VI)

wherein $R^1$ is the same as defined above.

2. The composition as set forth in claim 1, wherein a propylene carbonate is further added in the amount of 1 to 60 wt % by the total weight of the compound of the general formula (II).

3. A method for producing a polymeric ion conductive membrane characterized in that the composition as claimed in claim 1 is coated onto the surface of a lithium foil, aluminum foil, or lithium-copper foil and subjected to irradiation of UV radiations of 200 to 400 nm to be cured to form polymer network.

4. The method as set forth in claim 3, wherein the composition is further subjected to heat treatment after the irradiation of UV radiation.

5. A method for producing a polymeric ion conductive membrane characterized in that the composition as claimed in claim 2 is coated onto the surface of a lithium foil, aluminum foil or lithium-copper foil and subjected to irradiation of UV radiations of 200 to 400 nm to be cured to form polymer network.

6. A composition for polymeric ion conductive membrane according to claim 1, wherein the alkali cation is lithium or sodium.

* * * * *